United States Patent
Haimer

(10) Patent No.: US 9,987,689 B2
(45) Date of Patent: Jun. 5, 2018

(54) BALANCING OR MEASURING DEVICE

(71) Applicant: FRANZ HAIMER MASCHINENBAU KG, Igenhausen (DE)

(72) Inventor: Franz Haimer, Igenhausen (DE)

(73) Assignee: FRANZ HAIMER MASCHINENBAU KG, Igenhausen (DE)

( * ) Notice: Subject to any disclaimer, the term of this patent is extended or adjusted under 35 U.S.C. 154(b) by 407 days.

(21) Appl. No.: 14/420,698

(22) PCT Filed: Aug. 7, 2013

(86) PCT No.: PCT/EP2013/066537
§ 371 (c)(1),
(2) Date: Feb. 10, 2015

(87) PCT Pub. No.: WO2014/023760
PCT Pub. Date: Feb. 13, 2014

(65) Prior Publication Data
US 2015/0217381 A1    Aug. 6, 2015

(30) Foreign Application Priority Data

Aug. 10, 2012 (DE) .................... 10 2012 015 815

(51) Int. Cl.
*B23B 31/10* (2006.01)
*B23B 31/117* (2006.01)
(Continued)

(52) U.S. Cl.
CPC ........ *B23B 31/1173* (2013.01); *B23B 31/005* (2013.01); *B23B 31/117* (2013.01);
(Continued)

(58) Field of Classification Search
CPC . B23B 31/1173; B23B 31/005; B23B 31/117; B23B 31/202; B23B 2231/0224;
(Continued)

(56) References Cited

U.S. PATENT DOCUMENTS 5,301,961 A * 4/1994 Wozar ................. B23B 31/1177
279/46.2
2007/0187909 A1    8/2007 Troxler
2010/0270756 A1    10/2010 Guy

FOREIGN PATENT DOCUMENTS

DE    2361847    6/1974
DE    8019528    10/1980
(Continued)

OTHER PUBLICATIONS

English translation of International Search Report dated Nov. 22, 2013 for International Patent Application No. PCT/EP2013/066537 filed on Aug. 7, 2013.
(Continued)

*Primary Examiner* — Daniel Howell
*Assistant Examiner* — Paul M Janeski
(74) *Attorney, Agent, or Firm* — Paul D. Bianco; Gary S. Winer; Fleit Gibbons Gutman Bongini & Bianco PL

(57) ABSTRACT

A balancing or measuring device includes a main body which is rotatable about an axis and includes an opening for accommodating a coupling shaft of a component to be balanced or measured, and having a centering element which can be axially displaced within the main body against a spring arrangement to center the component in the main body. In order to ensure maximum concentricity also in a balancing or measuring device having a small number of parts, the spring arrangement is designed to be integral with the centering element.

18 Claims, 3 Drawing Sheets

(51) Int. Cl.
*B23B 31/00* (2006.01)
*B23B 31/20* (2006.01)

(52) U.S. Cl.
CPC .... *B23B 31/202* (2013.01); *B23B 2231/0224* (2013.01); *B23B 2260/022* (2013.01); *B23B 2260/026* (2013.01); *B23B 2270/06* (2013.01); *B23B 2270/12* (2013.01); *Y10T 279/26* (2015.01)

(58) Field of Classification Search
CPC ........ B23B 2260/022; B23B 2260/026; B23B 2270/06; B23B 2270/12; Y10T 279/26
See application file for complete search history.

(56) References Cited

FOREIGN PATENT DOCUMENTS

| | | |
|---|---|---|
| DE | 9115854 | 2/1992 |
| DE | 19961451 | 6/2001 |
| JP | S63283805 | 11/1988 |

OTHER PUBLICATIONS

Search results for German Patent Application No. 10 2012 015 815.7 filed Aug. 10, 2012.
English translation of Written Opinion for International Patent Application No. PCT/EP2013/066537 filed on Aug. 7, 2013.
English translation of International Preliminary Report on Patentability dated Feb. 10, 2015 for International Patent Application No. PCT/EP2013/066537 filed on Aug. 7, 2013.
Machine Translation of DE8019528 created Mar. 27, 2015.

\* cited by examiner

BALANCING OR MEASURING DEVICE

FIELD OF THE INVENTION

The invention relates to a balancing or measuring device and to a balancing or measuring machine with such a balancing or measuring device.

BACKGROUND OF THE INVENTION

From DE 199 61 451 A1, a balancing device for a tool holder is known in which, in a receptacle opening of a main body that rotates about an axis of rotation, a centering element constructed as a ball sleeve is arranged for centering a coupling shaft of the tool holder. The ball sleeve contains a sleeve-shaped ball cage in which ball-shaped rolling bodies are guided. To be able to pre-tension the ball cage without twisting toward the larger diameter side of the coupling shaft, several compression springs distributed in the circumferential direction are mounted between the ball cage and a support shoulder within the main body. A stop ring of the main body limits the displacement of the ball cage. Due to the compression springs, the ball cage can indeed move along with a defined displacement of the coupling shaft during the tensioning process, but problems with concentricity can be produced due to the greater number of individual parts that can move separately relative to each other.

SUMMARY OF THE INVENTION

One aspect of the invention relates to a balancing or measuring device of the type named above and a balancing or measuring machine with such a balancing or measuring device that guarantee a high degree of concentricity and reliable positioning of the centering element even with fewer individual parts.

Preferred improvements and advantageous embodiments of the invention are disclosed.

This task is achieved by a balancing or measuring device with the features of Claim 1 and by a balancing or measuring machine with the features of Claim 12. Preferred improvements and advantageous embodiments of the invention are the subject matter of the dependent claims.

In the balancing or measuring device according to the invention, the spring arrangement is constructed integrally with the centering element and connected rigidly to this element. Therefore, relative movements between the centering element and the spring arrangement, and therefore lack of concentricity, can be prevented. Fewer parts are also required, which reduces the complexity of production and assembly. Due to the spring arrangement provided on the centering element, the centering element can make an axial movement along with the coupling pin during the tensioning process and automatically return into the original position when loosened, due to the spring effect. Simplified operation is also achieved, because the centering element is always in the correct position and manual positioning is thus unnecessary.

In one especially preferred embodiment, the centering element can be constructed, e.g., as a rolling body sleeve with a sleeve-shaped rolling body cage and several rolling bodies supported therein. The spring arrangement can be formed in a simple and economical way in terms of production by a lower part of the rolling body cage provided with cut-outs. The lower part of the rolling body cage can be pressed through the cut-outs and returned to its original shape when the loading is removed.

To achieve a good spring effect, the rolling body cage can have one or more successive rows of cut-outs set apart from each other in the circumferential direction. The cut-outs can be constructed, e.g., as transverse slots running perpendicular to the center axis of the rolling body cage or as spiral-shaped slots. Other shapes of cut-outs are also possible.

Holding elements, e.g., in the form of angled tabs, which are flexible in the radial direction and project outward in the radial direction, can be provided on the outer periphery of the rolling body cage. In this way, the rolling body cage can be fixed and centered within the receptacle opening of the main body.

The rolling body cage can be mounted between a ring shoulder in the main body and a cover ring mounted on the top side of the main body. In this way, the centering element can be pre-tensioned. The rolling body cage, however, could also be inserted without pre-tensioning into a receptacle opening of the main body.

The rolling bodies can be constructed as balls and supported in corresponding openings of the rolling body cage. Other shapes of rolling bodies are also possible, however. The rolling body cage could have a round, polygonal, or other cross section.

The invention also relates to a balancing or measuring machine that contains a balancing or measuring device described above and constructed, e.g., as an adapter. Due to the embodiment as an adapter, the balancing or measuring device can be easily exchanged, and a balancing or measuring machine can be relatively quickly and easily adapted to different types of coupling shafts.

BRIEF DESCRIPTION OF THE DRAWINGS

Additional special features and advantages of the invention are given in the following description of preferred embodiments with reference to the drawing. Shown are.

DETAILED DESCRIPTION OF THE INVENTION

Figure 1:
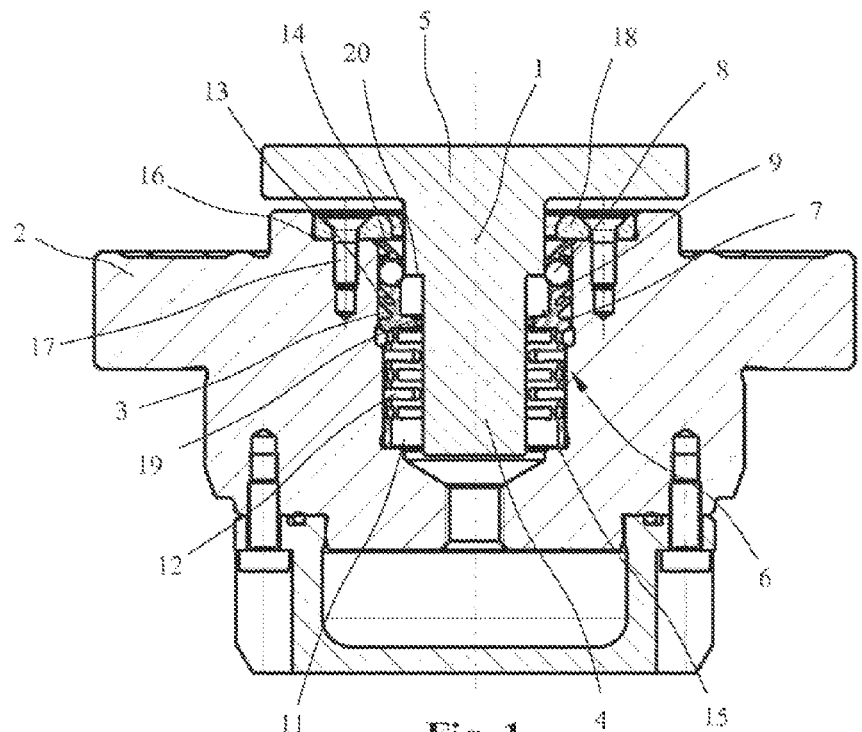
FIG. 1 a first embodiment example of a balancing or measuring device with a rolling body sleeve as a centering element in a non-tensioned position in cross section, FIG. 2 the balancing or measuring device of FIG. 1 with the rolling body sleeve in a tensioned position in cross section, FIG. 3 a first embodiment example of a rolling body cage of the rolling body sleeve of FIG. 1 in a non-tensioned position, FIG. 4 the rolling body cage of FIG. 3 in a tensioned position, FIG. 5 a second embodiment example of a rolling body cage of the balancing or measuring device of FIG. 1 in a non-tensioned position, FIG. 6 a second embodiment example of a balancing or measuring device with a rolling body sleeve as a centering element in a tensioned position in cross section, FIG. 7 a rolling body cage of the balancing or measuring device of FIG. 6 in a perspective view, and FIG. 8 the rolling body cage of FIG. 7 in a side view.
Figure 2:
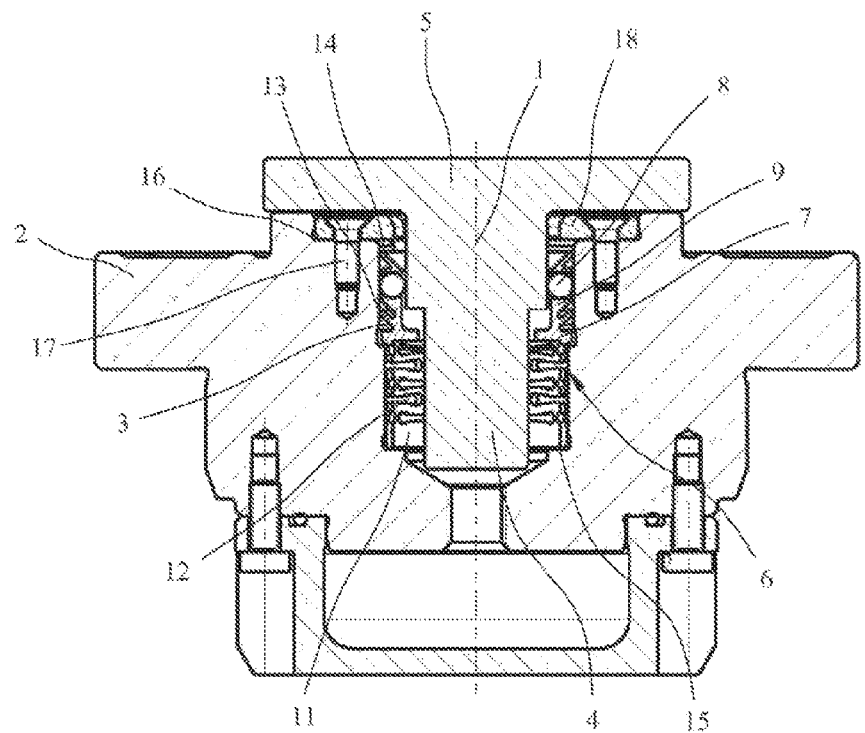

FIGS. 1 and 2 show a main body 2 that rotates about an axis of rotation 1 and contains a receptacle opening 3 for holding the coupling shaft 4 of a tool holder, tool, or some other component 5 to be balanced or measured. A centering element 6 that is coaxial to the axis of rotation 1 is inserted into the receptacle opening 3 of the main body 2 for the concentric centering of the component 5 within the receptacle opening 3 of the main body 2. The main body 2 and the centering element 6 are parts of a balancing or measuring device that is used in a balancing or measuring machine for the balancing or measurement of rotating components. In the shown embodiment, the main body with the associated centering element 6 is constructed as an adapter for mounting on a motor-driven machine spindle of a balancing or measuring machine. In this way, a balancing or measuring machine can be adapted relatively quickly and easily to different types of coupling shafts. The main body 2, however, could also be, e.g., the motor-driven machine spindle itself.

The centering element 6 arranged in the main body 2 is constructed in the shown embodiment as a rolling body bushing with a bushing-shaped rolling body cage 7 and several here ball-shaped rolling bodies 8 that are supported so that they can rotate in the rolling body cage 7.

Figure 3:
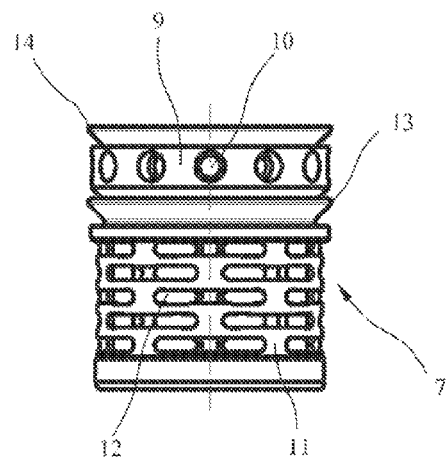
Figure 4:
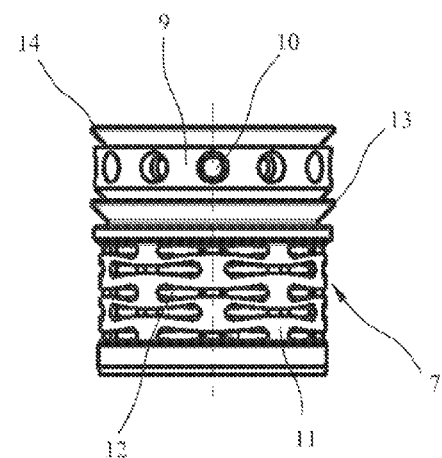
Figure 5:
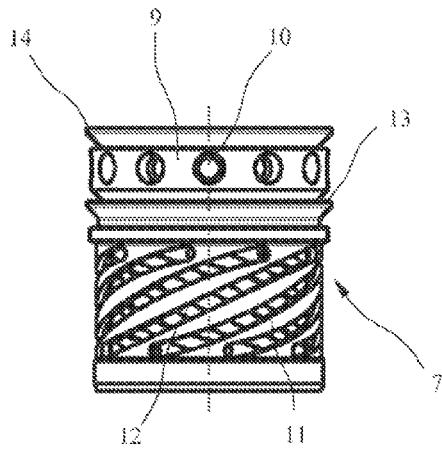

As can be seen especially from FIGS. 3-5, the bushing-shaped rolling body cage 7 contains an upper part 9 in which are arranged one row or several rows of openings 10 distributed uniformly across the circumference for holding the ball-shaped rolling bodies 8. In the here circular openings 10, the ball-shaped rolling bodies 8 are guided in the inward and outward directions. The rolling body cage 7 also contains a hollow cylindrical lower part 11 in which several cut-outs 12 are arranged distributed across the circumference.

In the embodiment shown in FIGS. 3 and 4, there are several rows of cut-outs 12 in the form of transverse slots, one after the other in the axial direction and spaced apart from each other in the circumferential direction. The cut-outs 12 of the successive rows are here offset relative to each other in the circumferential direction. The lower part 11 of the rolling body cage 7 can be pressed out of the original position shown in FIG. 3 into the position shown in FIG. 4 through these cut-outs 12 and forms a spring arrangement that provides for a return of the rolling body cage 7 to its original shape of FIG. 3 when the loading is removed. Between the upper part 9 and the lower part 11 and also at the upper end, the rolling body cage 7 has holding element 13 and 14 in the form of angled tabs that are flexible in the radial direction and project outward in the radial direction on the outer periphery. Through these tab-shaped holding elements 13 and 14 arranged in the circumferential direction, the rolling body cage 7 can be held centered within the receptacle opening 3 of the main body 2.

In FIG. 1, it can be seen that the rolling body cage 7 is mounted between a lower ring shoulder 15 in the receptacle opening 3 of the main body 2 and a cover ring 18 mounted by means of bolts 17 in a ring groove 16 on the top side of the main body 2 and is pre-tensioned in the axial direction. The rolling body cage 7 contains an inner ring tab 19 and the coupling shaft 4 has a shoulder 20.

In FIG. 5, another embodiment of a rolling body cage is shown. In this embodiment, the cut-outs 12 are constructed in the lower hollow cylindrical part 11 as spiral-shaped slots spaced apart from each other. Otherwise, this embodiment corresponds to that of FIGS. 3 and 4, so that elements that correspond to each other are also provided with the same reference symbols.

Figure 6:
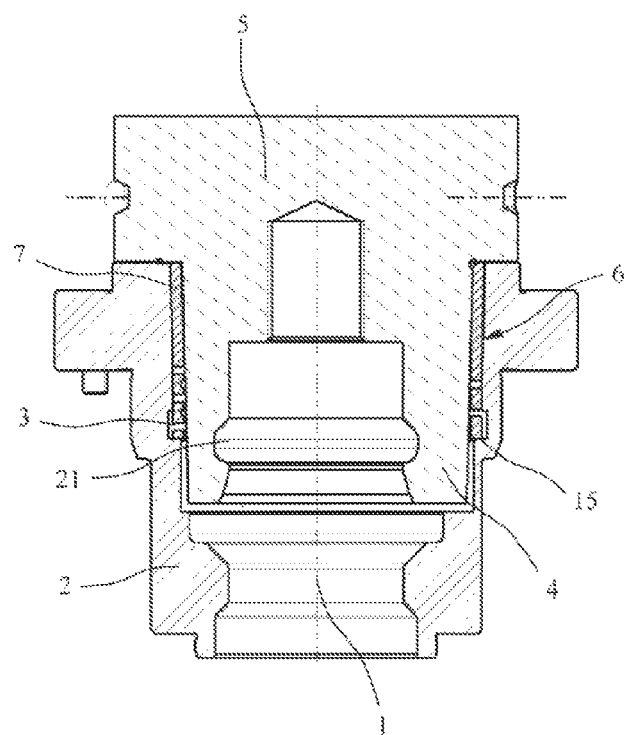

FIG. 6 shows a main body 2 that can rotate about an axis 1 in a balancing or measuring device for components 5 that have a conical coupling shaft 4 with a polygonal profile. In the shown embodiment, the component 5 is constructed as a tool holder with an inner ring groove 21 for engaging with chucks that can be tensioned from the inside to the outside in a tensioning device that is known and therefore not shown. Also in this embodiment, a centering element 6 that is coaxial to the axis of rotation 1 is inserted in a receptacle opening 3 of the main body 2 for concentric centering of the component 5 within the receptacle opening 3 of the main body 2. In the shown embodiment, the centering element 6 is likewise constructed as a rolling body bushing with a bushing-shaped rolling body cage 7 and several rolling bodies that are not shown here and are supported so that they can rotate in the rolling body cage 7. The rolling body cage 7 also sits with its lower end on a lower ring shoulder 15 in the receptacle opening 3 of the main body 2. In contrast to the embodiment of FIGS. 1-5, the rolling body cage 7 has a polygonal cross section and is not pre-tensioned against an upper cover ring.

Figure 7:
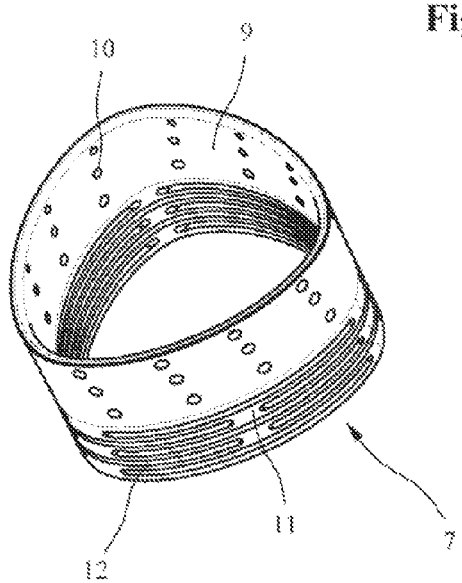
Figure 8:
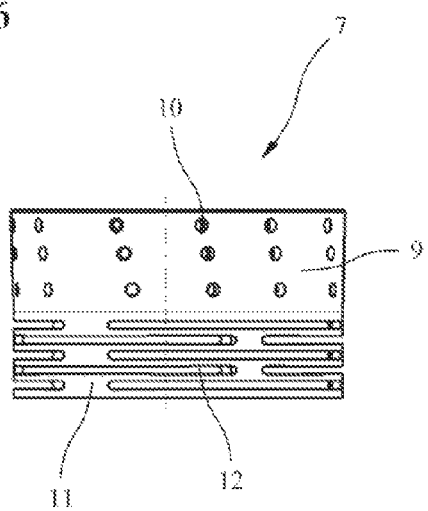

As can be seen in FIGS. 7 and 8, this rolling body cage 7 also contains an upper part 9 in which several rows of openings 10 distributed uniformly across the circumference, one above the other, are arranged for holding the rolling bodies 8. The openings 10 of the successive rows are offset relative to each other in the circumferential direction. In a lower part 11, several rows of cut-outs 12 distributed across the circumference are provided in the form of transverse slots. The cut-outs 12 of the successive rows are here offset relative to each other in the circumferential direction. Due to these cut-outs 12, the lower part 11 also here forms a spring element that allows deformation in the axial direction when the rolling body cage 7 is compressed.

The invention claimed is:

1. A balancing or measuring device comprising:
    a main body rotatable about an axis having a receptacle opening configured for holding a coupling shaft of a component to be balanced or measured by the device;
    a centering element arranged in the main body and having a rolling body cage;
    a plurality of rolling bodies supported by the rolling body cage;
    a plurality of holding elements arranged on an outer periphery of the rolling body cage; and
    a spring arrangement constructed integrally with the centering element;
    wherein the centering element is displaceable in an axial direction within the main body against the spring arrangement for centering the component in the main body.

2. The balancing or measuring device according to claim 1, wherein the holding elements are flexible in a radial direction and project outward from the outer periphery of the rolling body cage in the radial direction.

3. The balancing or measuring device according to claim 2, wherein the holding elements are formed as angled tabs.

4. The balancing or measuring device according to claim 1, wherein the rolling body cage is positioned and mounted between a ring shoulder in the main body and a cover ring mounted on a top side of the main body.

5. The balancing or measuring device according to claim 1, wherein the rolling body cage has a circular cross section or a polygonal cross section.

6. A balancing or measuring machine comprising the balancing and measuring device according to claim 1.

7. The balancing or measuring device according to claim 1, wherein the receptacle opening has a conical or a cylindrical shape configured for holding the coupling shaft.

8. The balancing or measuring device according to claim 1, wherein the spring arrangement is formed by a lower part of the rolling body cage.

9. The balancing or measuring device according to claim 8, wherein the lower part of the rolling body cage includes a plurality of cut-out slots.

10. The balancing or measuring device according to claim 9, wherein the cut-out slots are formed as transverse slots or as spiral-shaped slots.

11. The balancing or measuring device according to claim 1, wherein the rolling body cage comprises one or more successive rows of cut-out slots spaced apart in a circumferential direction.

12. The balancing or measuring device according to claim 1, wherein the rolling bodies are formed as balls.

13. The balancing or measuring device according to claim 1, wherein the rolling bodies are configured and arranged to be rotatable in an upper part of the rolling body cage.

14. A balancing or measuring device comprising:
a main body rotatable about an axis having a receptacle opening configured for holding a coupling shaft of a component to be balanced or measured by the device;
a centering element arranged in the main body and having a rolling body cage, the rolling body cage including one or more successive rows of cut-out slots spaced apart in a circumferential direction;
a plurality of rolling bodies supported by the rolling body cage;
a plurality of holding elements arranged on an outer periphery of the rolling body cage, the holding elements flexible in a radial direction and projecting outwardly from the outer periphery of the rolling body cage in the radial direction; and
a spring arrangement constructed integrally with the centering element;
wherein the centering element is displaceable in an axial direction within the main body against the spring arrangement for centering the component in the main body.

15. The balancing or measuring device according to claim 14, wherein the rolling body cage is positioned and mounted between a ring shoulder in the main body and a cover ring mounted on a top side of the main body.

16. A balancing or measuring machine comprising the balancing and measuring device according to claim 14.

17. The balancing or measuring device according to claim 14, wherein the spring arrangement is formed by a lower part of the rolling body cage.

18. The balancing or measuring device according to claim 14, wherein the rolling bodies are formed as balls and are configured and arranged to be rotatable in an upper part of the rolling body cage.

* * * * *